United States Patent [19]

Akasofu

[11] Patent Number: 4,584,638
[45] Date of Patent: Apr. 22, 1986

[54] NUMERICAL CONTROL APPARATUS

[75] Inventor: Kyosuke Akasofu, Aichi, Japan

[73] Assignee: Mitsubishi Denki Kabushiki Kaisha, Tokyo, Japan

[21] Appl. No.: 592,501

[22] Filed: Mar. 23, 1984

[30] Foreign Application Priority Data

Mar. 25, 1983 [JP] Japan ................................. 58-50105

[51] Int. Cl.⁴ .............................................. G05B 19/18
[52] U.S. Cl. ................................... 364/136; 364/140; 364/167; 364/474
[58] Field of Search ............... 364/136, 140, 141, 146, 364/147, 167-171, 474, 475

[56] References Cited

U.S. PATENT DOCUMENTS

| 4,029,950 | 6/1977 | Haga | 364/136 |
| 4,200,936 | 4/1980 | Borzcik et al. | 364/136 X |
| 4,368,511 | 1/1983 | Imazeki | 364/474 X |
| 4,396,987 | 8/1983 | Inaba et al. | 364/474 X |
| 4,415,965 | 11/1983 | Imazeki et al. | 364/136 |

*Primary Examiner*—Joseph Ruggiero
*Attorney, Agent, or Firm*—Sughrue, Mion, Zinn, Macpeak, and Seas

[57] ABSTRACT

A numerical control apparatus having an improved range of control functions and in which the management and use of the control program can be more easily performed. In accordance with the invention, a common data register group is provided so that reading and writing of data therefrom and thereinto can be performed by the work program side as well as by a programmable controller side.

9 Claims, 7 Drawing Figures

NUMERICAL CONTROL APPARATUS

BACKGROUND OF THE INVENTION

The present invention relates to a numerical control apparatus (hereinafter referred to as an NC apparatus) in which writing/reading can be commonly performed from a work program as well as a programmable controller.

FIG. 1 is a block diagram showing the arrangement of an NC apparatus. In the drawing, reference numeral 1 designates a tape in which a work program is stored using a special NC language, 2 a reading circuit, 3 a buffer memory, 4 a command decoding circuit, 5 a precalculation circuit, 6 a control circuit, 7 a shaft-displacement amount output circuit, 8 a pulse distribution circuit, 9 a servo unit, 10 a motor, 11 a detector, 12 a spindle rotation detector, 13 a programmable controller (hereinafter referred to as a PC), and 14 a machine tool to be controlled.

The NC apparatus is constituted by the reading circuit 2, the buffer memory 3, the command decoding circuit 4, the precalculation circuit 5, the control circuit 6, and the shaft-displacement amount output circuit 7. Sometimes the apparatus is said to include the pulse distribution circuit 8. As such an NC apparatus, the product MELDAS-L1 produced by Mitsubishi Electric Corporation of Japan, the products FANUC-3T and FANUC-6T produced by Fanuc Co. of Japan, and the products SINUMERIK-3T and SINUMERIK-8T produced by Siemens Co. of West Germany are known.

The operation of such an NC apparatus will be described in brief. The content of the program stored on the tape 1 is read out by the reading circuit 2 and stored in the buffer memory 3. Then, the program is decoded by the command decoding circuit 4 and subjected to preprocessing by the precalculation circuit 5. The resultant data of calculation is transferred to the next stage control circuit 6 to perform on-line control. That is, the amount of shaft displacement of the machine tool 14 is instructed by blocks of data of applied to the shaft-displacement amount output circuit 7 so as to cause the pulse distribution circuit 8 to actuate the servo unit 9 to drive the motor 10 to move the shaft of the machine tool 14. The detector 11 is attached to the motor 10 to detect the amount of rotation of the motor 10. The output of the detector 11 is fed back to the servo unit 9 to drive the motor 10 by a predetermined amount. The spindle rotation detector 12 is attached to spindle for the purpose of detecting the rotary speed of a rotating workpiece or a rotating tool. The output of the spindle is fed back to the pulse distribution circuit 8 and there used to synchronize the rotary speed of the motor 10 with that of the spindle.

The contents of the program on the tape 1 read by the reading circuit 2 include M-commands, S-commands, T-commands, etc. The M-command indicates control commands except a command instructing the displacement of a tool rest of the machine tool to be controlled, a command instructing the selection of cutting tool, and a command instructing the number of revolutions of the spindle. For instance, 100 different commands M00 to M99 are defined by Japanese Industrial Standard No. ISO-R1056. The S-command is used for instructing the speed of the spindle, and is expressed as, for example, S1500 which instructs a spindle speed of 1500 r.p.m. The T-command is a command instructing the selection of one out of a plurality of cutting tools mounted on a tool support. Generally, a plurality of cutting tools are mounted on a polygonal tool support which is rotatable so as to make the instructed cutting tool available. The T-command is expressed as, for example, T01 which instructs to select No. 1 cutting tool.

The PC 13 is a sequence used for performing control, such as oil pressure control, control relating to auxiliary function such as tool replacement, spindle drive, etc., that is, control functions except the control of shaft drive of the machine tool 14, and is arranged to exchange signals with the control circuit 6 to perform the above-mentioned control. That is, the PC 13 decodes M-, S-, T-commands provided by the control circuit 6 and produces signals which are applied as control signals to operating units for the machine tool in accordance with a predetermined sequence. In response to the control signals, mechanical operations of the machine tool are performed and the control circuit 6 is informed of the completion of execution of commands upon the detection of the mechanical operations.

Details of the operations of the PC 13 will be described. The description is made here with respect to the case where "COOLANT OIL ON" (M08) and "COOLANT OIL OFF" (M09) are given as control signals from the control circuit 6. FIG. 2 is a diagram showing a relay circuit for causing the operation of the above-mentioned commands to be performed. This circuit is realized by a program in the PC 13. In FIG. 2 reference numeral 20 designates a decoder circuit for the commands M08 and M09 from the control circuit 6, and 21 is a circuit for confirming the fact that the machine has been operated by the commands M08 and M09. M8*, M4*, M2* and M1* designate contacts respectively corresponding to the commands M80, M40, M20, and M10 issued from the NC apparatus and M*8, M*4, M*2, and M*1 designate contacts respectively corresponding to the commands M8, M4, M2, and M1 issued from the NC apparatus. The PC 13 decodes the commands M08 and M09 and provides its output to the machine side as shown in FIG. 3 to thereby perform "COOLANT OIL ON" and "COOLANT OIL OFF" operations.

In the conventional NC apparatus, however, the M-command, S-command, T-command, and the like are applied to the PC 13 unidirectionally from the work program of the tape 1.

Further, recently it has been understood that (1) it is desirable to refer to the data in the PC 13 from the work program side, and (2) it is desirable to issue more commands to the PC 13 from the work program side. However, there has been no NC apparatus provided with effective means for satisfying these requirements.

That is, there are new requirements for robot combination, automatic work measurement, tool life management etc. An NC apparatus which can meet such requirements is needed. To provide such an apparatus, it is necessary to expand the interface function with external devices such as machines measuring units, etc.

Although the command instructing the displacing of the tool support of the machine tool is transmitted to the pulse distribution circuit and the servo unit through the shaft-displacement amount output circuit 7, the PC 13 is used as an interface with the machine side for all other commands, and therefore it is convenient to achieve through the PC the above-mentioned expansion of the interface function.

Accordingly, the above-mentioned data at the PC 13 side is applied to external devices such as machines, measuring devices, etc., and in the case where an automatized system is employed in which, for example, a workpiece on which work has been completed is transported from the machine tool to an automatic measuring device using a handling robot and the NC apparatus receives the result of measurement to feed it back as a correction data for the next workpiece, the following are required:

(1) output of an operating command (displacement amount if necessary) to the handling robot;
(2) output of a measurement start command to the measuring device; and
(3) input of data of measurement result, etc.

Thus, there is a requirement for the data at the PC 13 side to be accessible from the work program side so as to increase the number of commands issued from the work program side to the PC 13.

SUMMARY OF THE INVENTION

The present invention has been attained in view of the above-mentioned circumstance.

An object thereof is to provide an NC apparatus having a control function covering a wide range.

Another object of the present invention is to provide an NC apparatus in which the management and use of the control program can be easily performed.

A further object of the present invention is to provide an NC apparatus in which when different work is to be performed, the work can be achieved merely by changing data without replacing the work program.

To attain the objects as described above, an NC apparatus according to the present invention is characterized in that a common data register group is provided so that reading/writing can be commonly performed by the work program as well as by the programmable controller.

DESCRIPTION OF THE PREFERRED EMBODIMENTS

Figure 1:
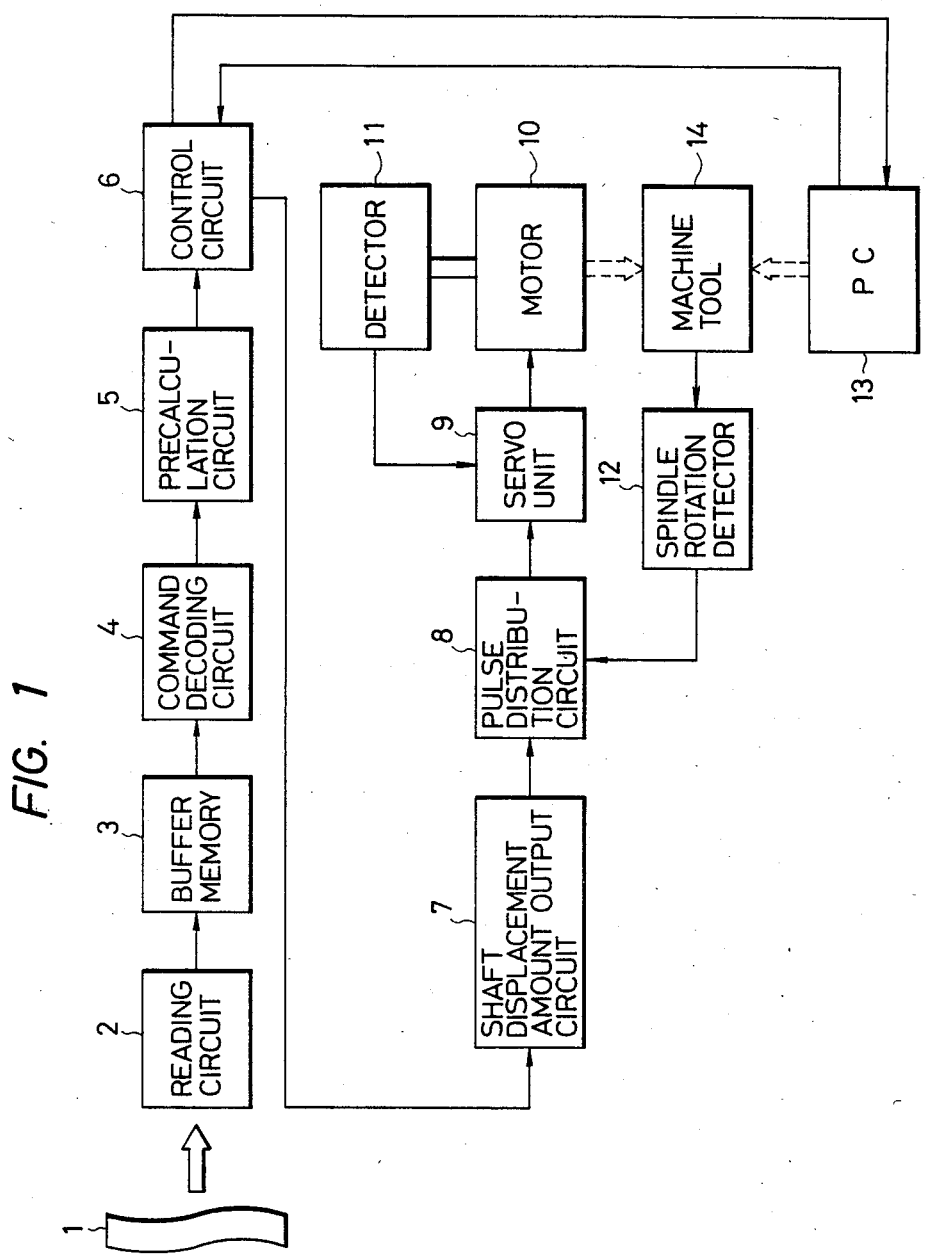
FIG. 1 is a block diagram showing the arrangement of an NC apparatus.
Figure 2:
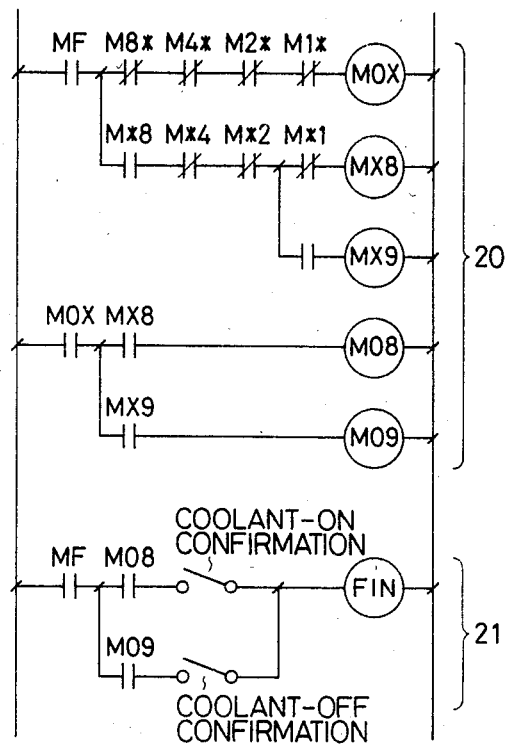
FIGS. 2 and 3 are relay circuit programs used for explaining the operation of a PC used in the NC apparatus of FIG. 1.
Figure 3:
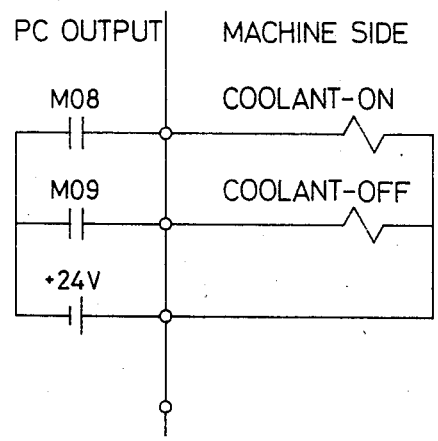

Referring to the drawings, a preferred embodiment of the present invention will now be described.

Figure 4:
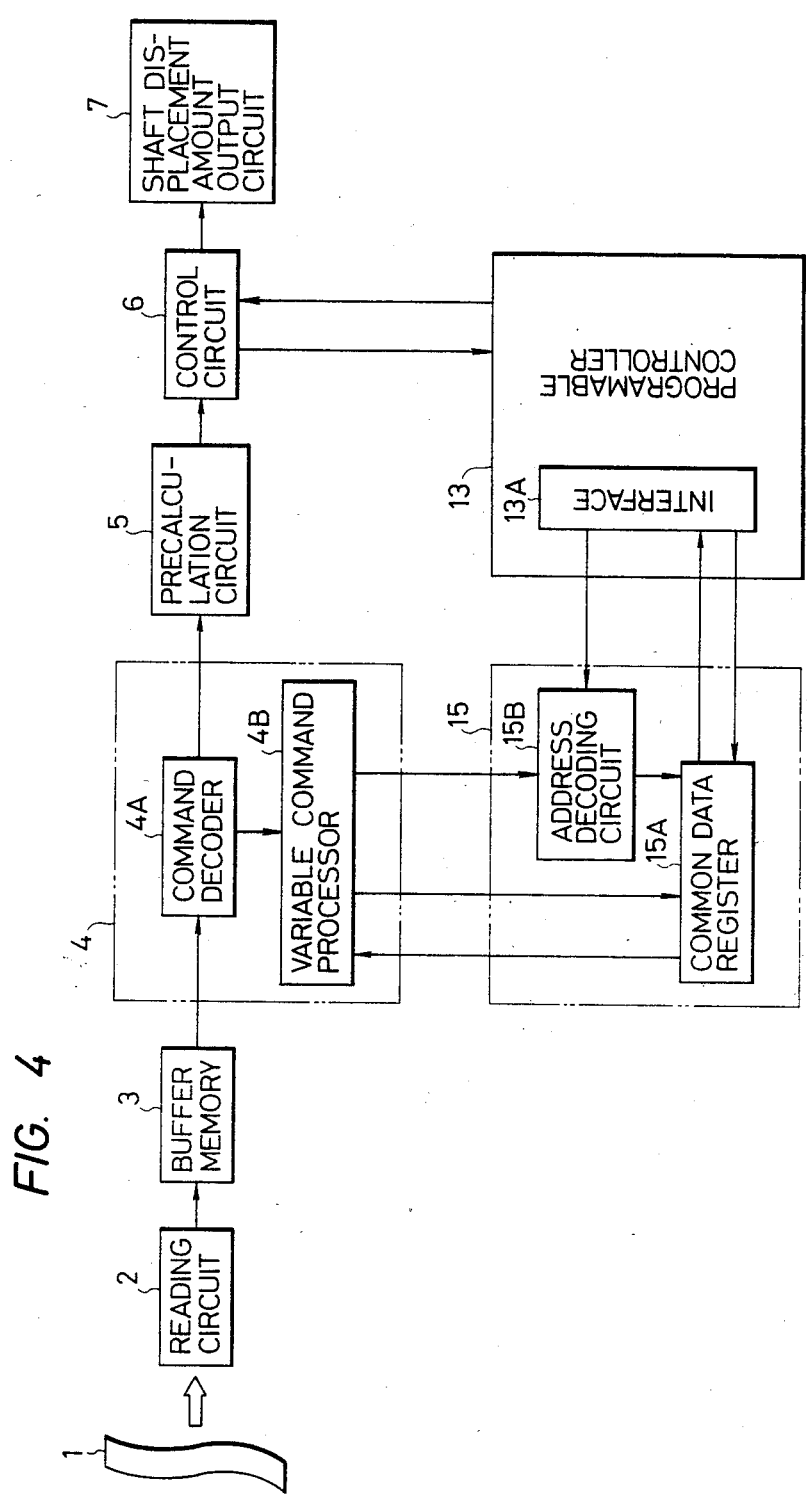
FIG. 4 is a block diagram of a preferred embodiment of an NC apparatus of the present invention.

FIG. 4 is a block diagram of a primary part of a numerical control apparatus constructed in accordance with the present invention. In FIG. 4, 4A and 4B designate a command decoder and a variable command processor, respectively, both of which are provided in the command decoding processing circuit 4 as shown in FIG. 1. A common data register group 15, constituted by two or more common data registers 15A and an address decoding circuit 15B, employs a dual-port random access memory so that the reading/writing of the data therein can be performed by the variable command processor 4B. Further, an interface 13A is provided in the PC 13 so that the reading/writing of common data can be performed through the interface 13A.

The arrangement of the remaining portions of the apparatus is the same as that of FIG. 1 and therefore a further description thereof is omitted.

The operation of the apparatus of the preferred embodiment will now be described.

It is assumed that the work program command used to set numerical data "dn" into the n-th register of the common data register group 15 is "Ln=dn". Upon the reception of this command, the command decoder 4A transfers the processing to the variable command processor 4B. In response to the numeral value "n" (which is address designation data), following the Roman character "L", the variable command processor 4B writes the numerical data "dn" into the n-th register in the common data register group 15.

It is determined that, when the content of the m-th register of the common data register group 15 is used as the numerical data of the work program, "Lm" is instructed in the numerical value portion following the address character in the NC work program. For example, when the content of the m-th register is used in place of the X-axis command value "100" in "G00 X 100", the work program command is "G00 X Lm". Upon the reception of the above-mentioned command, the command decoder 4A transfers the processing to the variable command processor 4B. With the numerical value "m" following the character "L" as the address designation data, the content of the m-th register of the common data register group 15 is read and substituted for the numerical data of the address "X" of the above-mentioned program command "G00 X Lm".

Next, the PC 13 reads the contents of the p-th register of the common data register group 15 at a predetermined time and sets the data "dq" into the q-th register of the common data register group 15 or the contents "dr" of the r-th register is read out therefrom depending on the read-out content of the p-th register.

Figure 5:
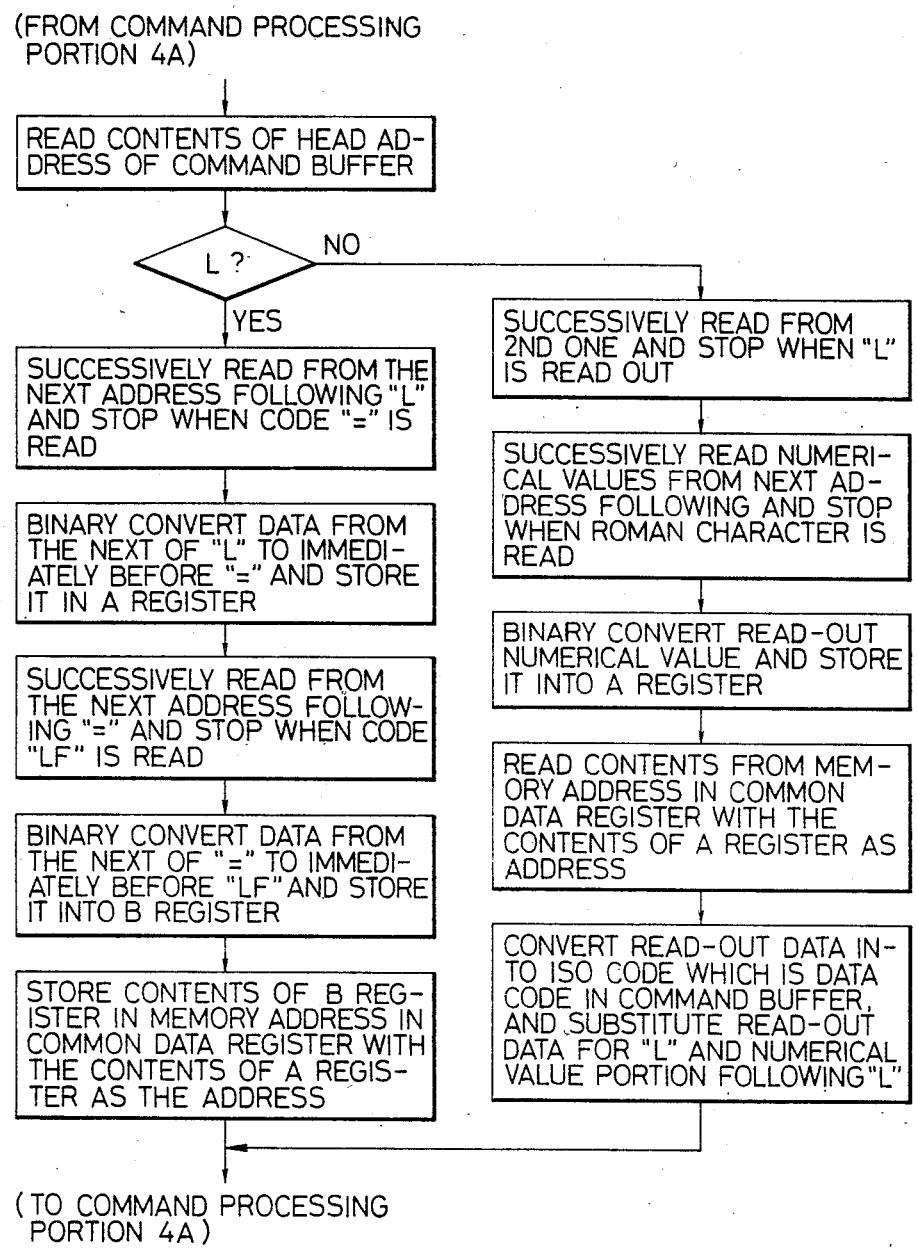
FIG. 5 is a flowchart used for explaining the execution of variable command processing.

FIG. 5 is a flowchart showing the operation of the variable processor 4B. In this figure, the program command "Ln=dl" or G00 X Lm" containing the character "L" in the work program is received through the command buffer from the command processing portion 4A. Accordingly, it can be determined that in the case where the character "L" is set at the head of the command buffer, the command is "Ln=dl", while in the case where the character "L" is not so set, the command is "G00 X Lm".

Figure 6:
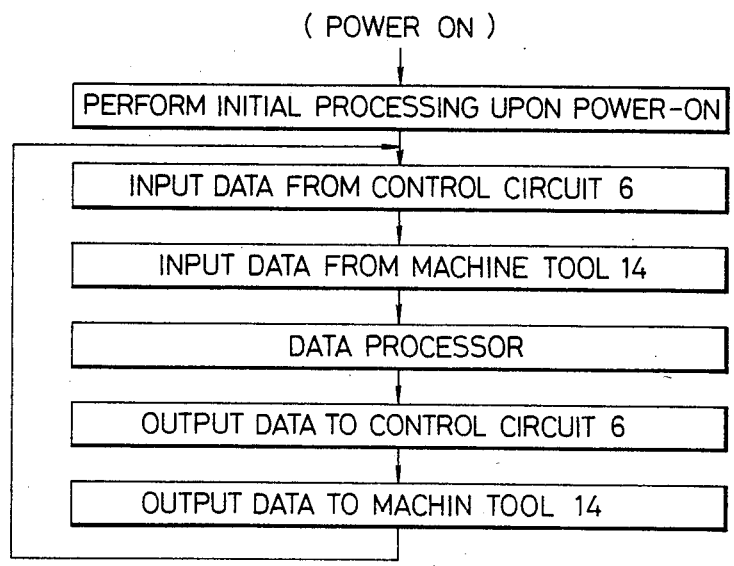
FIG. 6 is a flowchart used for explaining the operation of the programmable controller.
Figure 7:
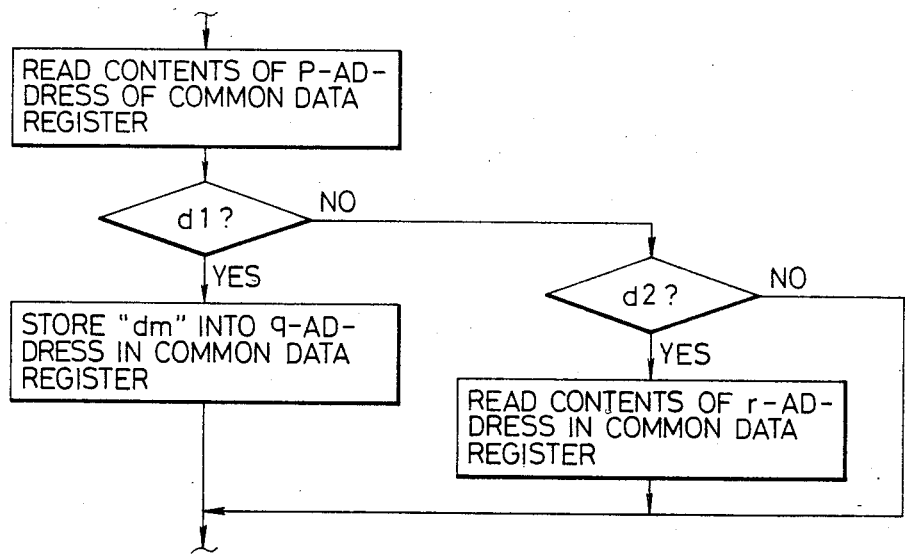
FIG. 7 is a flowchart used for explaining a main part of a PC according to the present invention.

FIG. 6 is a flowchart showing the operation of the PC 13. Data is synchronously exchanged between the PC 13 and each of the machine tools 14 and the control circuit 6. FIG. 7 is a flowchart of a main part of the PC 13 in accordance with the present invention. The operations specified by this flowchart are carried out in the data processor indicated in FIG. 6. The common data register group 15 can be accessed from the work program side as well as the PC 13 side, and hence control functions covering a wider range than those of the conventional NC apparatus can be realized by arranging in advance the uses of the individual registers of the common data register group 15 between the work program forming side and the PC 13 side.

For example, in the case where a handling robot associated with a machine tool for attaching/removing/conveying a workpiece is caused to operate at the beginning and end of the work, conventionally, data indicating the amount and speed of displacement of the handling robot is stored in a control device of the handling robot and the operation start timing is issued from an NC apparatus at the machine tool side. In the conventional system, however, there is a problem that it is necessary to change both the work program and the program stored in the handling robot every time the work to be effected changes so that the management and practical use of the program are very troublesome. According to the present invention, however, it is sufficient to effect the management and practical use of only the work program for all types of work because not only the operating start signal, but also the amount and speed of displacement of the handling robot can be issued from the work program to the control device for the handling robot through the PC 13.

As described above, the NC apparatus according to the present invention is provided with a common data register group 15 including two or more registers and is arranged so that writing and reading can be carried out from the work program side as well as the PC side. The invention is therefore advantageous in that control functions covering a wider range than could be obtained with the conventional NC apparatus are attainable.

I claim:

1. A numerical control apparatus comprising:
   a reading circuit for reading a work program from a tape on which said work program is stored in an NC language;
   a command decoding circuit including a command decoder for decoding work commands in the work program read out by said reading circuit and a variable command processor for processing a variable command in the work command decoded by said command decoder;
   a control circuit for outputting a control signal for controlling a machine tool in accordance with the work command decoded by said command decoding portion;
   a shaft displacement amount output circuit for outputting a command signal instructing the amount of shaft displacement of said machine tool in response to said control signal from said control circuit;
   a programmable controller for performing control other than shaft drive of said machine tool in response to said control signal from said control circuit; and
   a common data register group for commonly storing data corresponding to variables processed by said variable command processing portion and data written into and read out from said common data register group.

2. The numerical control apparatus according to claim 1, in which said variable command processor comprises means for reading data out of said common data register group in accordance with a variable command in the work command.

3. The numerical control apparatus according to claim 2, in which said variable command includes a command instructing reading data out of said common data register group and an address designating command.

4. The numerical control apparatus according to claim 3, in which said variable command processor comprises means for writing data into said common data register group in accordance with the variable command in the work command.

5. The numerical control apparatus according to claim 4, in which said variable command includes a command instructing writing data into said common data register group, an address designating command, and data to be written.

6. The numerical control apparatus according to claim 1, in which said common data register group comprises an address decoding circuit and a plurality of registers.

7. The numerical control apparatus according to claim 1, in which said programmable controller comprises a sequencer.

8. The numerical control apparatus according to claim 7, in which said programmable controller comprises an interface coupled to said common data register group.

9. The numerical control apparatus according to claim 7, in which said sequencer performs oil pressure control, tool replacement control, and spindle drive control for said machine tool.

* * * * *